(12) United States Patent
Pellenc et al.

(10) Patent No.: US 7,818,953 B2
(45) Date of Patent: Oct. 26, 2010

(54) SELF-CENTERING STRADDLING HARVESTING HEAD FOR SMALL FRUIT HARVESTING MACHINE AND MACHINE EQUIPPED WITH SUCH HARVESTING HEAD

(75) Inventors: Roger Pellenc, Pertuis (FR); Jean-Marc Gialis, Cheval Blanc (FR)

(73) Assignee: Pellenc, Societe Anonyme, Pertuis (FR)

( * ) Notice: Subject to any disclaimer, the term of this patent is extended or adjusted under 35 U.S.C. 154(b) by 212 days.

(21) Appl. No.: 11/477,016

(22) Filed: Jun. 28, 2006

(65) Prior Publication Data
US 2007/0012018 A1 Jan. 18, 2007

(30) Foreign Application Priority Data
Jul. 12, 2005 (FR) .................................. 05 07466

(51) Int. Cl.
*A01D 46/00* (2006.01)
(52) U.S. Cl. .................... 56/330; 56/10.2 R; 56/121.41
(58) Field of Classification Search .................. 56/15.5, 56/121.4, 121.41, 121.46, 330, 10.2 R, 10.2 D, 56/10.2 F, 14.9–15.4, 208–217, 328.1
See application file for complete search history.

(56) References Cited
U.S. PATENT DOCUMENTS

| | | | | |
|---|---|---|---|---|
| 3,184,908 A * | 5/1965 | Rust | .............................. | 56/330 |
| 3,187,493 A * | 6/1965 | Harrett | ......................... | 56/330 |
| 3,538,694 A * | 11/1970 | Holloway | ..................... | 56/330 |
| 3,636,688 A * | 1/1972 | Fontan et al. | ................. | 56/330 |
| 3,890,774 A * | 6/1975 | Bruel | ........................... | 56/330 |
| 3,890,775 A * | 6/1975 | Bruel | ........................... | 56/330 |
| 3,979,891 A * | 9/1976 | Patton | ......................... | 56/328.1 |
| 4,180,966 A * | 1/1980 | Zen | ............................. | 56/208 |
| 4,341,062 A * | 7/1982 | Scudder | ....................... | 56/330 |
| 4,974,404 A * | 12/1990 | Korthuis et al. | ............... | 56/330 |
| 5,341,630 A * | 8/1994 | Littau | .......................... | 56/330 |
| 5,647,194 A * | 7/1997 | Scott et al. | ................. | 56/328.1 |
| 5,956,933 A * | 9/1999 | Heard | ......................... | 56/329 |
| 6,145,291 A * | 11/2000 | Jarmain | ....................... | 56/330 |
| 6,463,725 B1 * | 10/2002 | Briesemeister | ............. | 56/340.1 |
| 6,901,731 B2 * | 6/2005 | Scott et al. | .................... | 56/330 |
| 2005/0229575 A1 * | 10/2005 | Merant | ....................... | 56/328.1 |

* cited by examiner

*Primary Examiner*—Thomas B Will
*Assistant Examiner*—Mai T Nguyen
(74) *Attorney, Agent, or Firm*—Egbert Law Offices PLLC (57) ABSTRACT

A harvesting apparatus has a harvesting head suitable for connection to a traveling carrier and suitable for straddling a row of fruit-bearing plants. A straddling carrier has the harvesting head mounted thereon. An actuator arrangement is provided and is cooperative with the harvesting head so as to move the harvesting head in relation to a median plane of the straddling carrier. A centering mechanism is cooperative with the harvesting head so as to center a lower portion of the harvesting head in relation to the row of fruit-bearing plants. A controller is cooperative with the centering system.

17 Claims, 9 Drawing Sheets figure-1 figure-2 figure-4 figure-5 figure-6 figure-7 figure-8 figure-9

SELF-CENTERING STRADDLING HARVESTING HEAD FOR SMALL FRUIT HARVESTING MACHINE AND MACHINE EQUIPPED WITH SUCH HARVESTING HEAD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention concerns a self-centering straddling harvesting head for small fruit harvesting machines.

More specifically, it concerns a "self-centering" straddling harvesting head for berry or small fruit harvesting machines, especially for grape harvesting machines of the type made of two sub-assemblies rigidly assembled at their upper part and between which a corridor is provided that allows for their movement on each side of a row of vine stocks or other plants. Each of said sub-assemblies comprising:
- a fruit detaching system usually consisting of a shaking device;
- a receiving device for the detached fruit most frequently consisting of an articulated platform consisting of inclined and swinging overlapping plates or aprons;
- a transport device for the collected raw harvest; and
- usually, a harvest receiving bin or discharge device.

The invention concerns also harvesting machines for berries or small fruit, especially self-propelled grape harvesting machines equipped with said "self-centering" harvesting head.

BACKGROUND OF THE INVENTION

Harvesting heads of the above-mentioned type equip practically all harvesting machines available on the market today.

Because of the fact that the harvesting head straddles over the row of vine stocks or other shrubs, it is important that its two sub-assemblies stay as much as possible at equal distance from said vine stocks, when moving, for proper performance of the berry detaching systems. The machine operator must thus make sure that the harvesting head is always centered on the vine stock alignment.

However, it often happens that whenever the vines are low or not tied, or not very well tied, that the vegetation hanging down onto the ground is very dense and therefore partially or completely hides the vine stocks so that the operator is lacking the necessary reference points to correct the machine offset in relation to the vine row axis.

To eliminate this disadvantage, most current machines use a so-called "pendulum" guiding system actuated through the effect of gravity on the harvesting head and through the bearing of the vines onto said head.

Under this pendulum suspension system, the harvesting head is mounted on two horizontal pins, on the front and back. Such hinge pins are positioned much higher than the center of gravity of the harvesting head and in the same vertical plane in order to obtain a symmetric reaction of the pendulum consisting of said head. Guiding is achieved through the bearing reaction of the vine stocks onto the lower part of the harvesting head.

However, this pendulum guiding system currently used by most self-propelled harvesting machine builders has major disadvantages.

The major problem derived from this system results from the fact that centering is achieved through the reaction of the vine stocks on the lower guide ramps located on the lower part of the harvesting head, usually between the receiving device for the grapes and bunches stripped from the vine stocks (mobile aprons or bucket conveyors) and the ground, the distance between both parallel guide ramps making up the mechanical corridor of said harvesting head.

It is easily understood that because of the great inertia of the swinging harvesting head assembly, the reaction on the vine stocks is sometimes violent, especially at the entry of a row when the first vine stock engages into the mechanical corridor and supports by itself the reaction of the harvesting head whose the weight can be up to a mass of approximately three tons.

In addition, a pendulum system makes it necessary to provide for the lowest center of gravity in relation to the pendulum axis, which eliminates the possible mounting of the receiving bins on the swinging assembly, which would cause to add a very significant inertia when the bins are filling. In addition, the not always even filling of said bins would unbalance the pendulum, which would off-center the mechanical corridor in relation to the vine row.

It is also understood the pendulum effect triggered by gravity is also triggered by parasitic accelerations caused by the uneven contour of the ground on which the machine moves, or by the directional effects of a change of path caused by the direction of the carrier vehicle. Such parasitic accelerations are usually perpendicular to the pendulum axis, and the highly undesirable effect thereof is to trigger the guiding of the mechanical corridor but not in the right direction and to create counter-reactions on the vine stocks that may cause their breaking.

Some builders have tried to correct the above-described problem by proposing towed-type machines coupled to the tractor vehicle through an articulated drawbar or self-propelled harvesting machines with an articulated frame.

BRIEF SUMMARY OF THE INVENTION

The purpose of the invention is a harvesting head and a machine equipped with said head, especially a self-propelled harvesting machine allowing for automatic self-centering of said harvesting head over its full range of operation, in relation of the stock alignment, regardless of its weight and the position of its center of gravity G.

Under the invention, this goal is achieved through a harvesting head dependent on one or more means capable of imparting, during operation, movements on either side in relation to the median vertical plane of the straddling carrier on which it is mounted, such means being driven by at least one control system and capable of centering at least the lower part of said harvesting head in relation to the plants in the row.

According to another characteristic arrangement, the means capable of centering at least the lower part of the harvesting head includes at least one mechanical component integral with said harvesting head.

According to another characteristic arrangement, the means capable of centering at least the lower part of the harvesting head includes at least one electrical, or hydraulic, or pneumatic actuator.

According to a preferred embodiment, the means capable of centering the harvesting head are deigned and arranged so as to impart to said head movements perpendicular to the median vertical plane of the straddling carrier, during operation, when said harvesting head is mounted on the straddling carrier, i.e., movements perpendicular to the travel of said head.

According to an interesting embodiment, the harvesting head is subject to the action of least two lateral actuators making it possible to establish a mechanical link between said harvesting head and lateral components of the straddling carrier frame.

According to a preferred embodiment, the lateral actuators making up the means for the centering movements of the harvesting head consist of hydraulic jacks with double piston rod and identical piston section volume According to another advantageous embodiment, the means for the centering movements of the harvesting head comprise a third hydraulic jack with a double piston rod arranged between the lateral jacks and installed at the upper part of the harvesting head, this third jack or central jack having preferably a piston section volume identical to that of the lateral hydraulic jacks.

According to another highly advantageous embodiment, the means for the movements and centering of the harvesting head also make up the means of a mechanical link of said head with the straddling carrier frame.

According to another characteristic arrangement, the control system for the harvesting head centering means comprises position sensors installed on both sides of the center corridor permitting to run by the plants, during operation, preferably in the lower part and in front of said corridor.

According to possible embodiments, the position sensors consist of mechanical probes or ultrasound or microwave radars, or optical systems.

Through the invention, whenever the machine moves along a row of vine or other plants, the harvesting head is automatically centered, in its full functionality (harvesting system+ harvest receiving bins or harvest unloading device), regardless of the weight and position of the center of gravity of said harvesting head. This guiding is done on either side of the vine row and independently of the front and rear wheels of the machine.

The system under the invention is not at all sensitive to the parasitic accelerations induced by the directional effects of the carrier vehicle, nor to those caused by the uneven ground on which the machine is moving.

In addition, this system is perfectly suited for quick coupling and uncoupling of the harvesting head in case of multifunctional use of the carrier vehicle.

In the application to harvesting machines and more specifically to self-propelled harvesting machines, the invention is based on a simple concept that consists of enabling the harvesting head, regardless of the carrier position, to follow the vine row, through positional control, by actively basing itself on the stocks. Such positional control of the harvesting head on the stocks is, very advantageously, achieved in an electro-hydraulic fashion.

The implementation of the harvesting head under the invention offers many advantages, especially in the application to self-propelled harvesting machines. For example, the following advantages are pointed out:

Increased travel speed allowing for a gain of 1-2 km/hr. compared to the current techniques and with at least equivalent quality, this gain representing a 25% improvement of productivity, which is economically very important.

No bearing of the active head onto the plant to position itself, which prevents the leaf stripping caused by pendulum heads and the harvest is thus higher quality.

The active harvesting head is never off in relation to the position of the vine stocks; the positional control is proportional to the travel speed, which ensures perfect positioning and prevents damage, including stock pulling.

On highly rocky soil, the head compensates for the carrier variations without having the inertia of pendulum heads.

Easy entry into the rows: in the headlands, the operator can intentionally move the head to the side that will enable him to facilitate such entry (saving of time and protection of the first stock and canopy).

The operator knows the position of its harvesting head at all times, which ensures increased comfort and also simpler operation of the machine.

BRIEF DESCRIPTION OF THE SEVERAL VIEWS OF THE DRAWINGS

The above-mentioned goals, characteristics and advantages, and others will become more evident form the following description and the attached drawings.

DETAILED DESCRIPTION OF THE INVENTION

Reference is made to said drawings to describe advantageous, although not limiting, embodiments of the "self-guiding" harvesting head under the invention and of harvesting machines equipped therewith.

In the attached drawings, the components common to the various embodiments shown are designated using identical references.

A very interesting application of the invention to berry or other small fruit harvesting machine equipment is described below, but it should be pointed out that other agricultural applications of the guiding system described below would be possible so that in this case the expression "working head" should replace the expression "harvesting head".

The harvesting head and the machine equipped therewith are advantageously applicable to the harvesting of berries or small fruit such as, for example, black currant, gooseberries, raspberries, olives, . . . and especially to the harvesting of grapes for wine making. For this reason, reference is made in this description to a harvesting head mounted on the straddling carrier frame B of a grape harvesting machine, but this illustration of examples of embodiments is of course in no way limiting.

The berry croppers, such as grape harvesters, include a harvesting head permanently supported by a self-propelled straddling carrier structure, or designed so as to be able to be mounted in a removable manner on a self-propelled straddling carrier.

Figure 1:
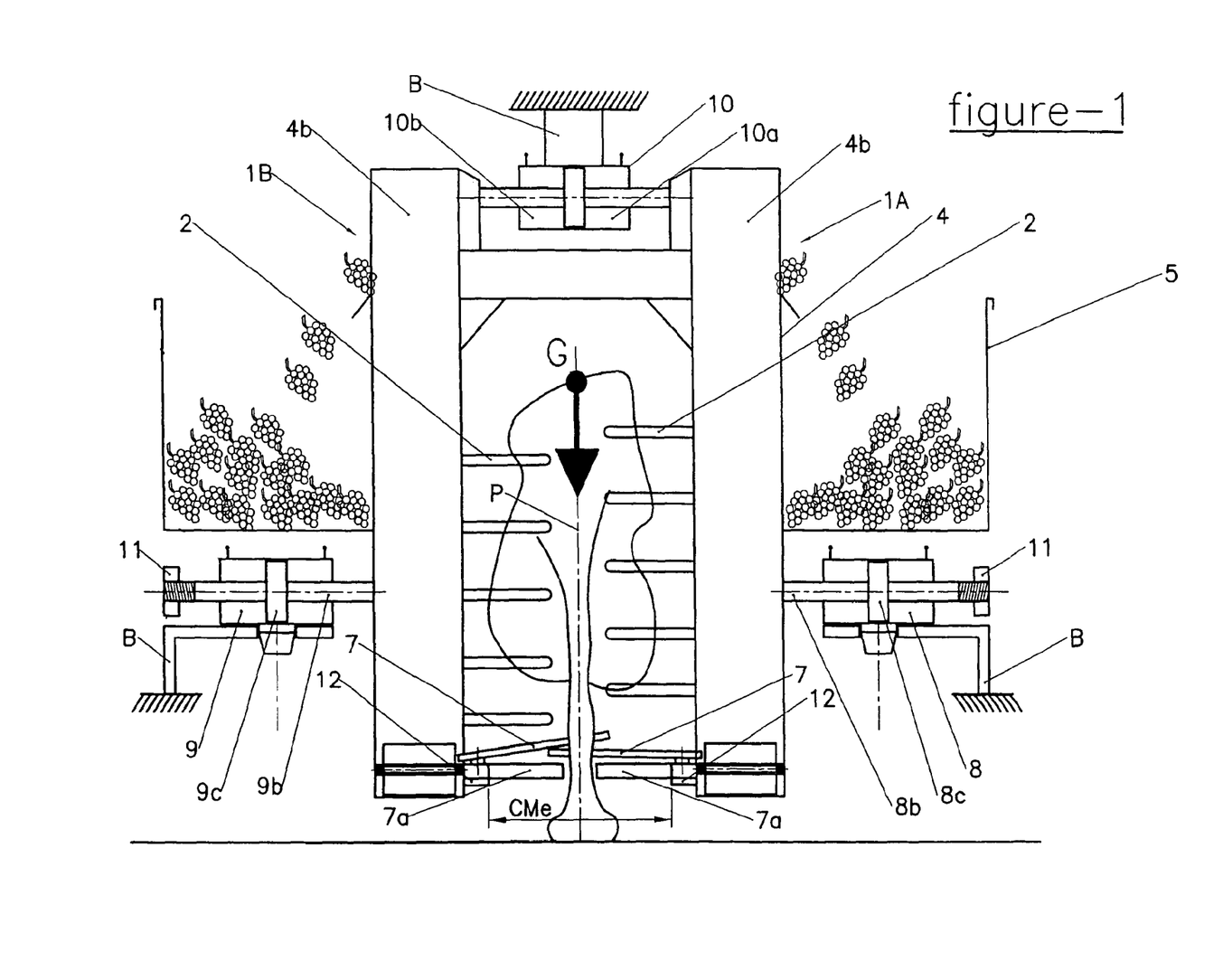
FIG. 1 is a schematic front view of a first embodiment of a harvesting head under the invention.
Figure 2:
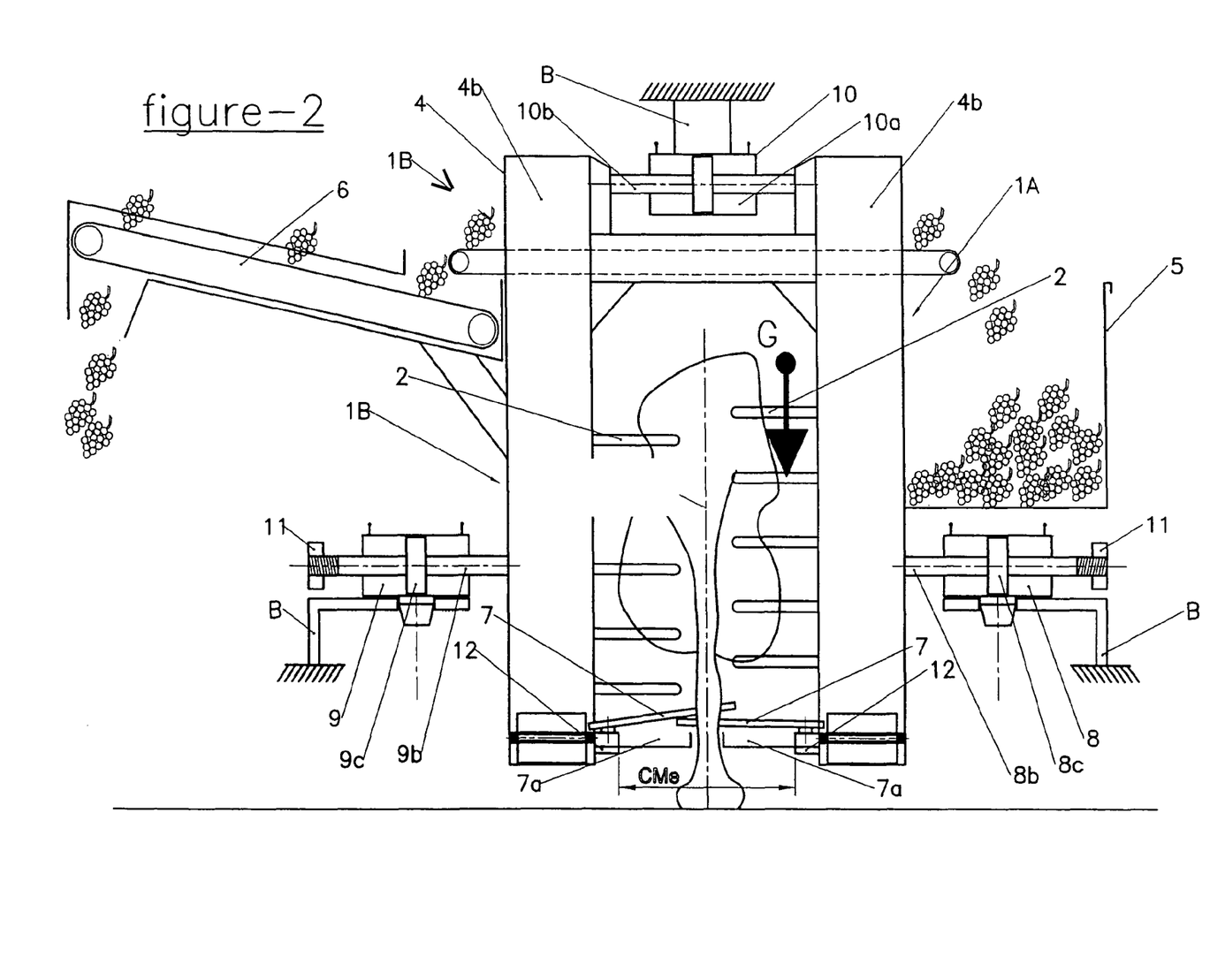
FIG. 2 is a front schematic view of another possible arrangement of this harvesting head.
Figure 3:
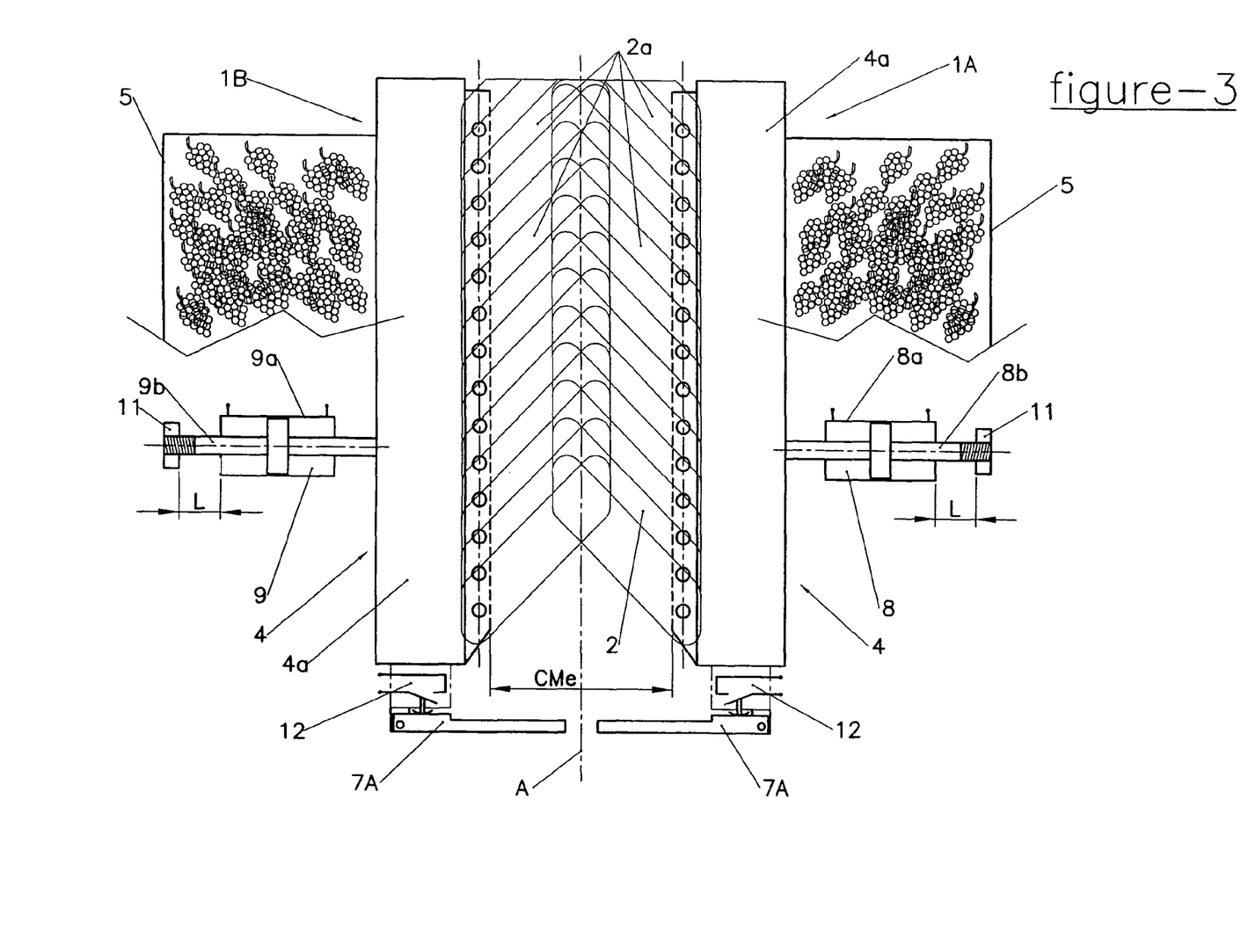
FIG. 3 is a top plan view of FIG. 1.

The harvesting head 1 under the invention is of the type consisting, in its full functionality, of two sub-assemblies 1A, 1B rigidly assembled at their upper and between which a corridor is provided for going through the row of vine stocks or other shrub, lapped over by said harvesting head. Each of the sub-assemblies 1A, 1B comprises:

- a fruit detaching system, usually consisting of a shaking device 2;
- a detached fruit receiving system, for example consisting of an articulated platform consisting of inclined and mobile overlapping plates or aprons that come together around the stocks;
- a transport device for the collected raw harvest, most often consisting of a conveyor 4 with a lower horizontal section 4a and an upward section 4b conveying the raw harvest to the upper part of the harvesting head and a harvest receiving bin 5 or lateral discharge device 6 for said harvest. For example, according to FIGS. 1 and 3, each sub-assembly of the harvesting head comprises a harvest receiving bin 5, while in FIG. 2, one (1B) of the sub-assemblies comprises a lateral unloading arm 6 while the second (1A) sub-assembly comprises a bin 5 that can be a relay-bin of the type described in the French Patent Application No. 04/03647.

According to a first characteristic arrangement of the invention, the harvesting head is dependent on one or more means capable of imparting to said head, during operation, movements on either side in relation to the median vertical plane P-P of the straddling carrier B inside which it is installed. The latter can be of a type designed to be coupled to a tractor or be built into a self-propelled machine.

The means capable of centering at least the lower part of the harvesting head 1 comprises at least one mechanical component integral with said harvesting head.

The means capable of imparting centering movements to the harvesting head 1 comprises at least an electric, or hydraulic, or pneumatic actuator permitting to establish a mechanical link between the straddling carrier B and said harvesting head.

Figure 9:
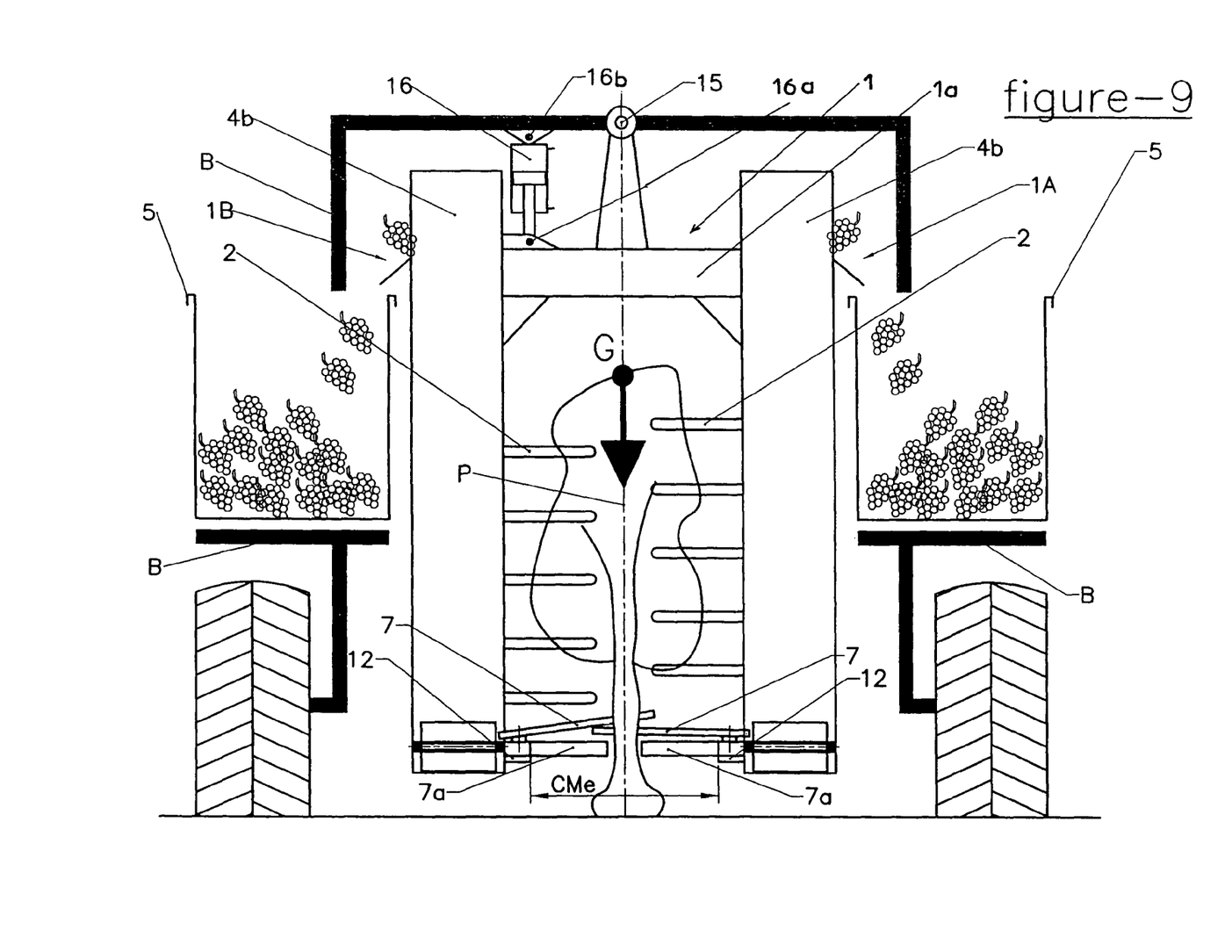
FIG. 9 is a schematic front view of another embodiment of a harvesting machine under the invention.

An embodiment implementing one single actuator is shown in FIG. 9 that shows a harvesting head 1 hanging in a pendulum manner, through a pin 15, from an upper component of the straddling carrier B. Under the example shown, the actuator 16 consists of a double effect jack attached through its opposite ends and with articulations 16a and 16b, on one hand to an upper component 1a of the harvesting head and, on the other hand, to said upper component of the straddling carrier B.

Preferably and according to the embodiments shown in FIGS. 1 through 6, the means providing for the centering movements of the harvesting head are designed and arranged so as to impart to said head movements perpendicular to the median vertical plane P-P of the straddling carrier B.

According to these embodiments and to a very interesting characteristic of the invention, the means providing for the movements and centering of the harvesting head are also the only means of mechanical link of the latter with the bearing frame B of the straddling carrier, without any other mechanical interface.

According to another characteristic arrangement, said means comprise at least two lateral actuators 8 and 9, respectively, designed to establish a mechanical link between each side of the harvesting head 1 and supports provided symmetrically on the vertical parts of the straddling carrier B frame.

According to an advantageous embodiment, the means providing for the centering movements of the harvesting head 1 comprise at least two lateral jacks, 8 and 9, respectively, through which said head is connected or can be connected to the straddling carrier B.

Preferably, these lateral centering jacks 8 and 9 consist of hydraulic jacks with a double piston rod and identical piston section volume.

Advantageously, the means providing for the centering movements of the harvesting head comprise a third hydraulic jack, preferably consisting of a double piston rod jack 10 arranged between the lateral jacks 8 and 9 and installed at the upper part of the harvesting head, this third jack or central jack having a piston section volume identical to that of the lateral hydraulic jacks.

As evident from the above, the three jacks 8, 9 and 10 fulfill two functions:

- they provide for the movement of the harvesting head of the grape harvesting head, from right to left and vice-versa in relation to the axis of the vine row; and
- they carry the full weight of the harvesting head, without any other mechanical interface.

Whenever the harvesting head is installed permanently on a self-propelled straddling carrier, the jacks are integral with said carrier while said jacks, while whenever said harvesting head is intended to be mounted in a removable manner onto a multifunctional straddling carrier, said jacks and carrier are designed in a complementary manner so as to permit quick and easy coupling and uncoupling of said head.

Preferably, the body 8a, 9a, 10a of jacks 8, 9 and 10 respectively is permanently attached or designed to be able to be attached in a removable manner onto frame B of the straddling carrier while the double rod 8b, 9b of the lateral jacks is rigidly attached, through one of its ends, to a lateral component of the harvesting head frame and the double rod 10b of the central jack 10 is rigidly attached, through both its ends, to an upper component of said frame.

The right and left lateral jacks 8 and 9 are equipped with an adjusting system for the travel of their piston 8c, 9c, respectively, and, therefore for travel L of the harvesting head, to the right or to the left. This adjusting system can consist of a nut 11 screwing into the threaded external end 8b' or 9b' of the double rod 8b or 9b. Such adjustment permits to optimize to the millimeter the left and right movement of the harvesting head inside the straddling carrier B so as to allow for the largest movement possible without affecting the harvesting head coupling and uncoupling capability. The dynamic corridor value CDy of said head is thus equal to the mechanical corridor value CMe of same plus twice the value of the set travel (L), or (Cdy)=(CMe)+2(L).

The harvesting head under the invention is equipped with a control system capable of controlling the centering of said head in relation to the vine stocks or other plants in a vine stock row or other plants According to an interesting embodiment, this control system comprises position sensors 7A, or 7B, or 7C, installed on both sides of the corridor, permitting, during the harvest, to run by the vine stocks and canopy, said position sensors being preferably positioned at the entry and on the lower part of said corridor.

The position sensors 7A, 7B, 7C, for example installed at the entry of the mechanical corridor CMe of the harvesting head, on both sides of the symmetry axis A of said head can consist of mechanical probes, or ultrasound or microwave radars, or optical systems.

In the case of position sensors consisting of ultrasound or microwave radars, or optical systems, the harvesting head comprises an electric or electronic interface configured in a known manner to control the distributors, and/or the proportional distributors, and/or the servo distributors, and/or servo valves used to ensure the operation of the actuators.

In FIGS. 1-4, the position sensors consist of flexible probes 7A that, whenever they come in contact with the vine stocks, actuate electric or electronic contact elements 12 that, in turn, control one or more electro-distributors, or proportional electro-distributors, or servo-distributors, or servo-valves that feed the chambers of lateral jacks 8 and 9. According to the hydraulic circuit shown in FIG. 4, the electric or electronic contact elements 12 control one or more hydraulic distributors ED-G or ED-D, depending on whether the offset is to the left or to the right. The "right" hydraulic electro-distributor ED-D communicates with the outside chamber C1 of the right hydraulic jack 8 whose inside chamber C2 communicates with one C3 of the chambers of the central jack 10 while the "left" hydraulic electro-distributor ED-G communicates with the outside chamber C4 of the left hydraulic jack 9 whose inside chamber C5 communicates with the second chamber C6 of said central jack 10.

Figure 4:
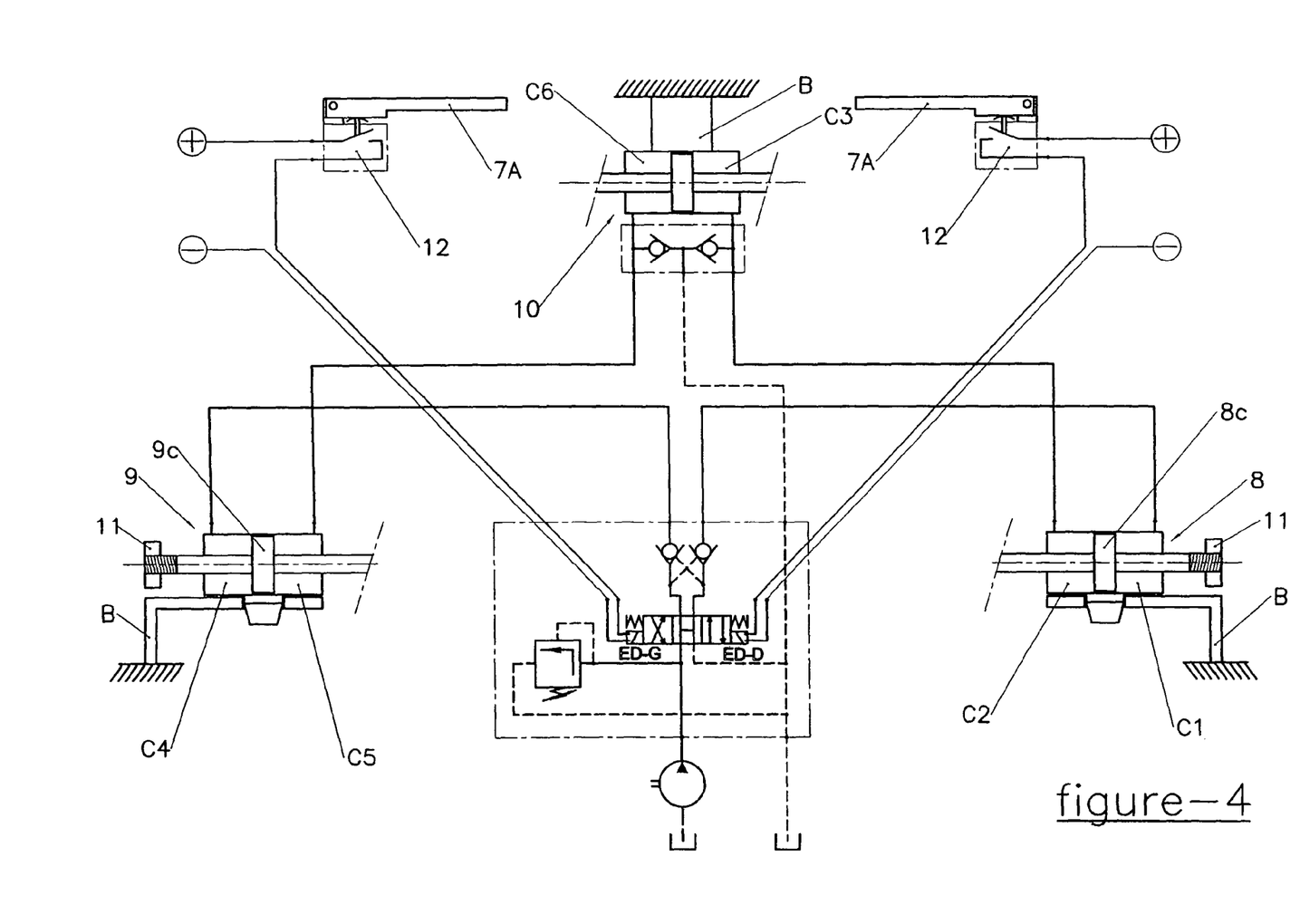
FIG. 4 is a schematic representation of the automatic guiding system shown in FIGS. 1 through 3.

For example, referring to FIG. 4, if the harvesting machine drifts to the right in relation to the axis A of the vine row, the left flexible probe 7A touches the vine stock and actuates the associated left electric or electronic contact element 12 that, in turn, controls one of the two coils of the left hydraulic electro-distributor ED-G.

Such control permits to send oil into the outside chamber C4 of the left hydraulic jack 9 that fills for the duration of the contact. The result of the filling of chamber C4 is that the same quantity of oil is discharged from the chamber C5 of this same jack. The oil discharged from the chamber C5 of the left jack 9 is fed into the chamber C6 of the central jack 10. The effect of the filling of the latter is that the same quantity of oil is discharged from the other chamber C3 of the central jack 10. The oil discharged from the chamber C3 of the central jack 10 is fed into the inside chamber C2 of the right jack 8, and the effect thereof is that the same quantity of oil is discharged from the outside chamber C1 of this same jack. The effect of the equal thrust applied onto the left surface of the pistons 8c, 9c of the lateral jacks 8 and 9 is to induce a right-to-left movement of the harvesting head that is strictly identical in all points, from front to back of the mechanical corridor CMe or from bottom to top of said harvesting head assembly.

The result of the fact that the three hydraulic jacks 8, 9, 10 always travel the same distance is that no strain is put onto the structure of the harvesting head frame. It is indeed easy to understand that if the hydraulic jacks were to push the straddling frame structure from left to right or from right to left with only one jack, the excess thrust would systematically be absorbed by the frame structure, which would generate significant deformations of the mechanical corridor. Such deformations would not be acceptable to ensure proper sealing of the grape crop by the aprons of the detached fruit receiving articulated platform.

The harvesting head under the invention also preferably comprises two position sensors that detect if the guiding travel L is exceeded up so as to notify the machine operator who can then correct the path of the carrier vehicle using the latter's steering wheel.

Figure 5:
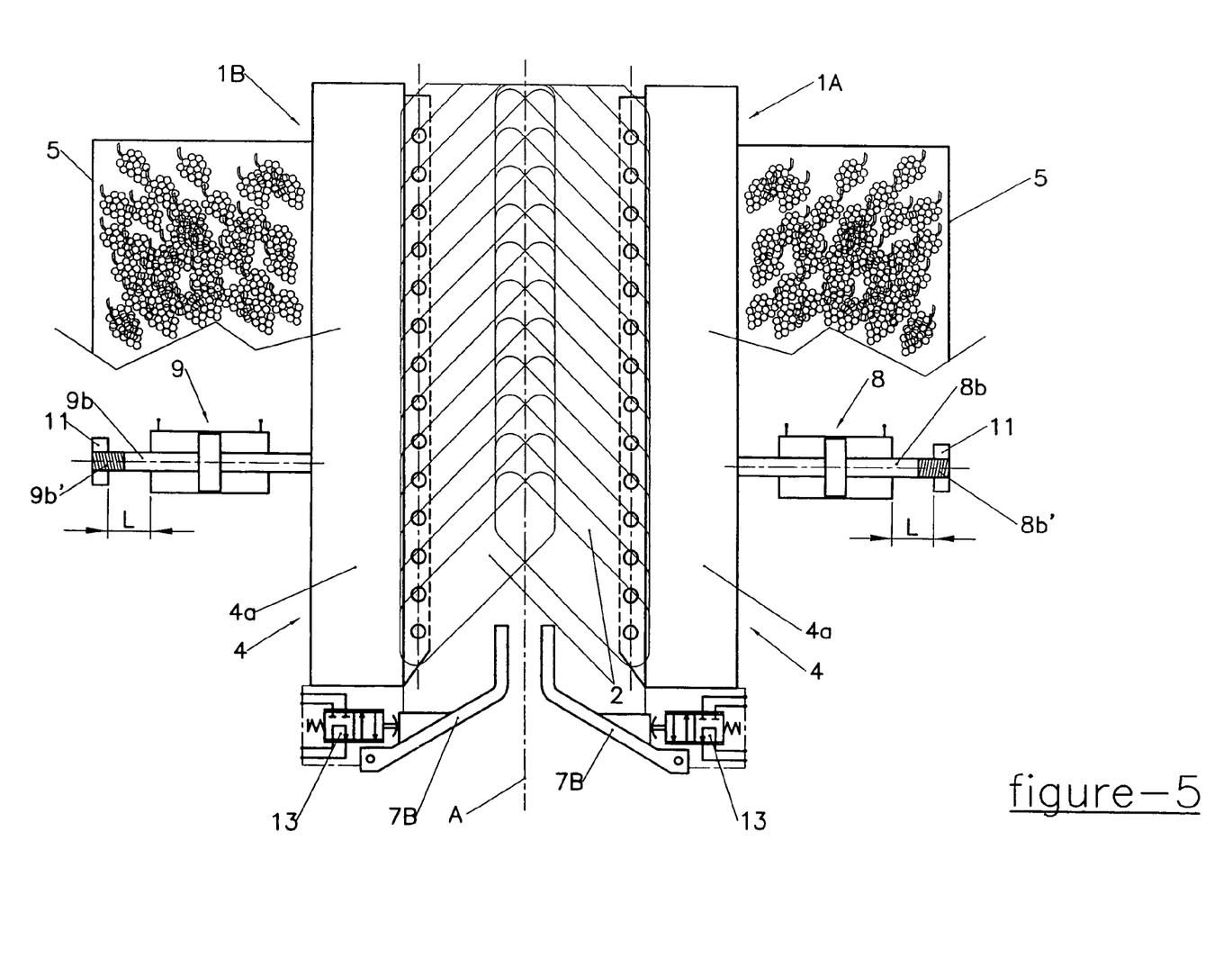
FIG. 5 is a top plan view of a second embodiment of the harvesting head under the invention.
Figure 6:
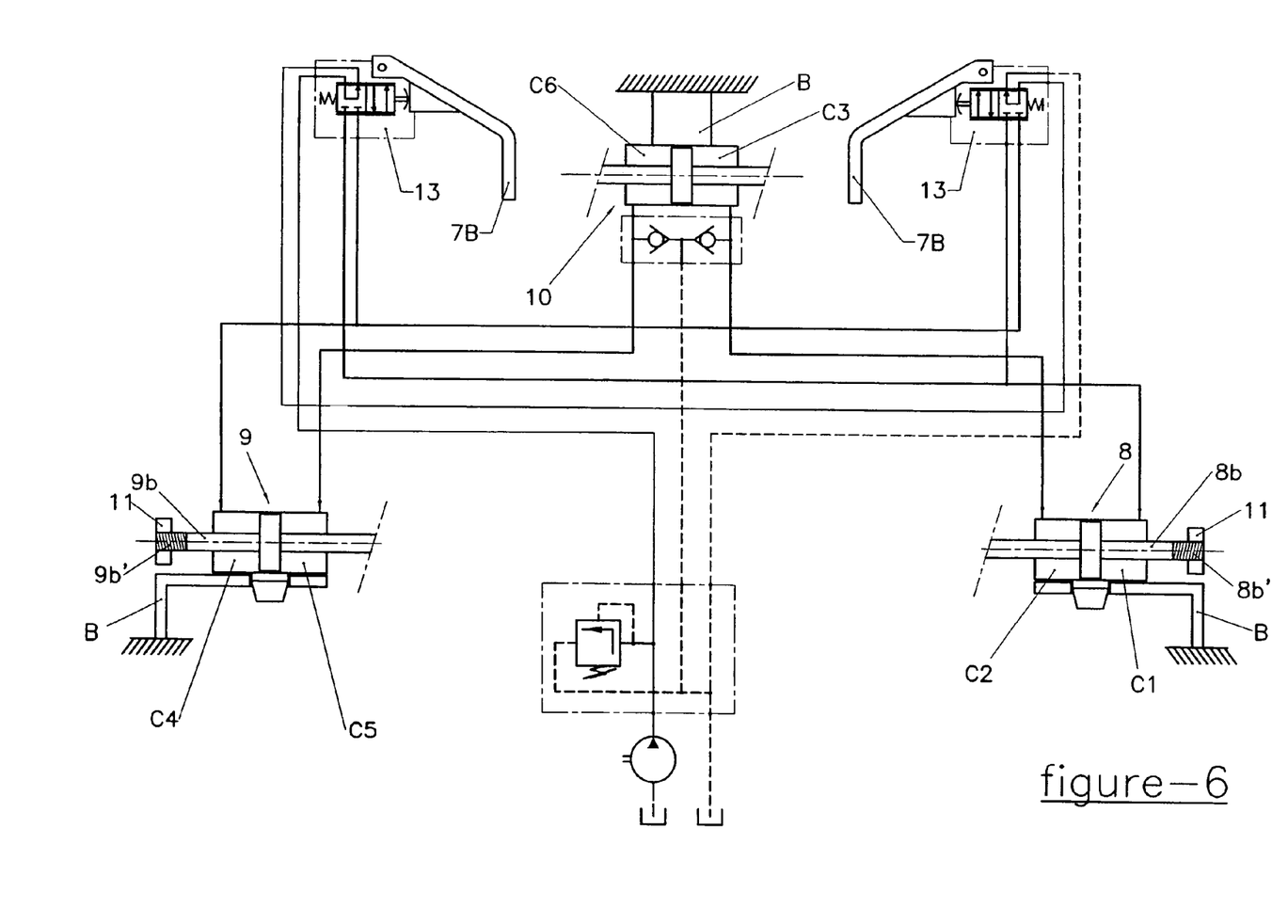
FIG. 6 is a schematic view of the automatic centering system shown in FIG. 5.

In FIGS. 5 and 6, a third embodiment is shown, that differs from the one just described, mainly because of a design under which the position sensors placed at the entry of the mechanical CMe of the harvesting head consist of rigid probes 7B, each sensor actuating directly a hydraulic distributor 13 installed close to said sensor. In this figure, the central jack 10 is not shown.

According to this embodiment, the description of the operation of the jacks 8,9,10 is roughly the same as in the above-described example.

Figure 7:
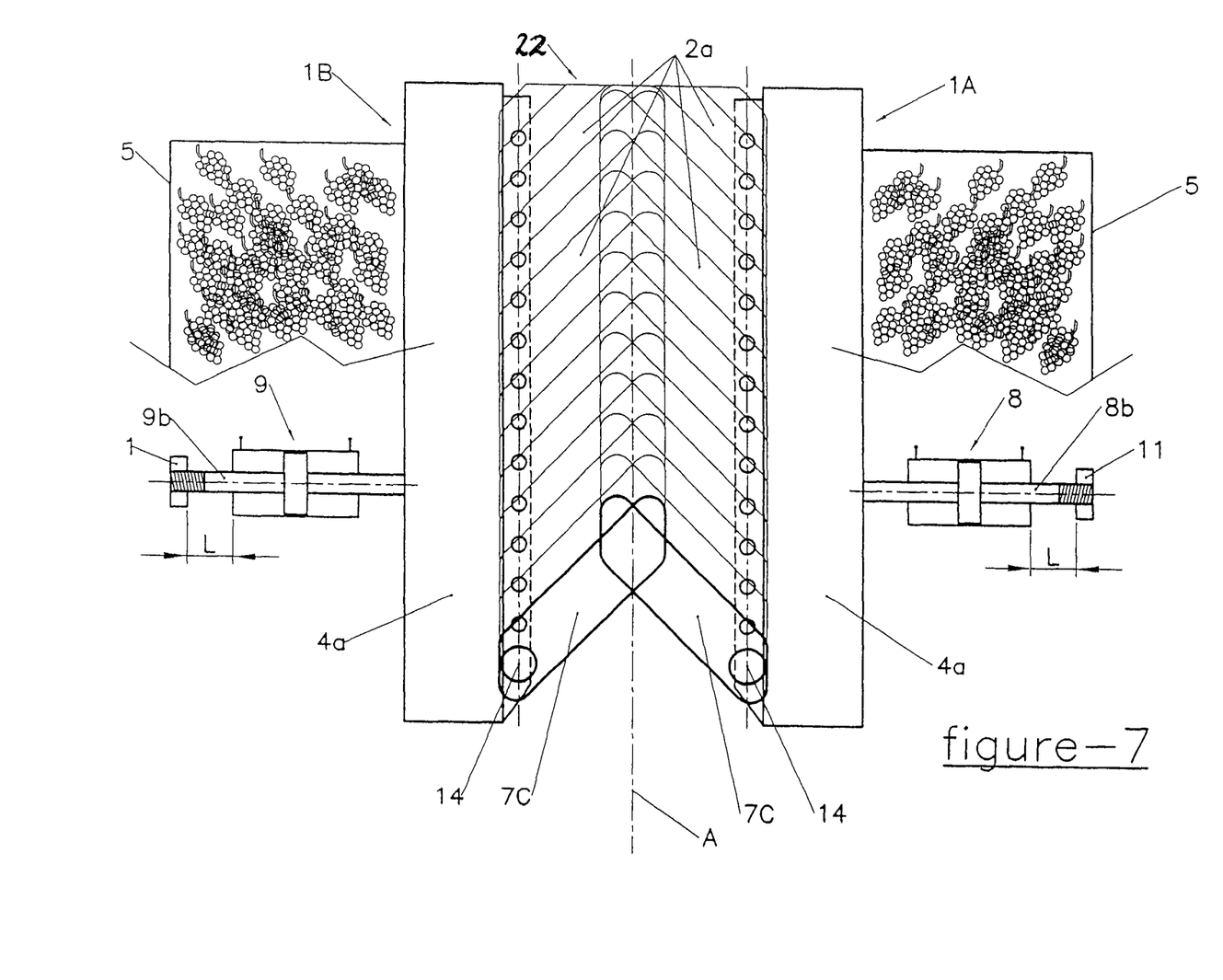
FIG. 7 is a top plan view showing a third embodiment of the harvesting head under the invention.

FIG. 7 shows a fourth embodiment according to which the position sensors placed on both sides of the mechanical corridor CMe and in front of it consist of the first pivoting apron 7C of each row of right and left overlapping aprons 2a making up the mobile platform receiving the detached berries.

These sensor aprons act on an electric contact actuating a hydraulic electro-distributor or actuate directly a hydraulic electro-distributor, as described above.

Considering that the pivoting aprons 2a making up the mobile platform 22 receiving the harvest are installed symmetrically by pair on both sides of the mechanical corridor CMe, the position sensors could consist of one or more pairs of aprons arranged at a or any distance(s) from the entry of said corridor.

Figure 8:
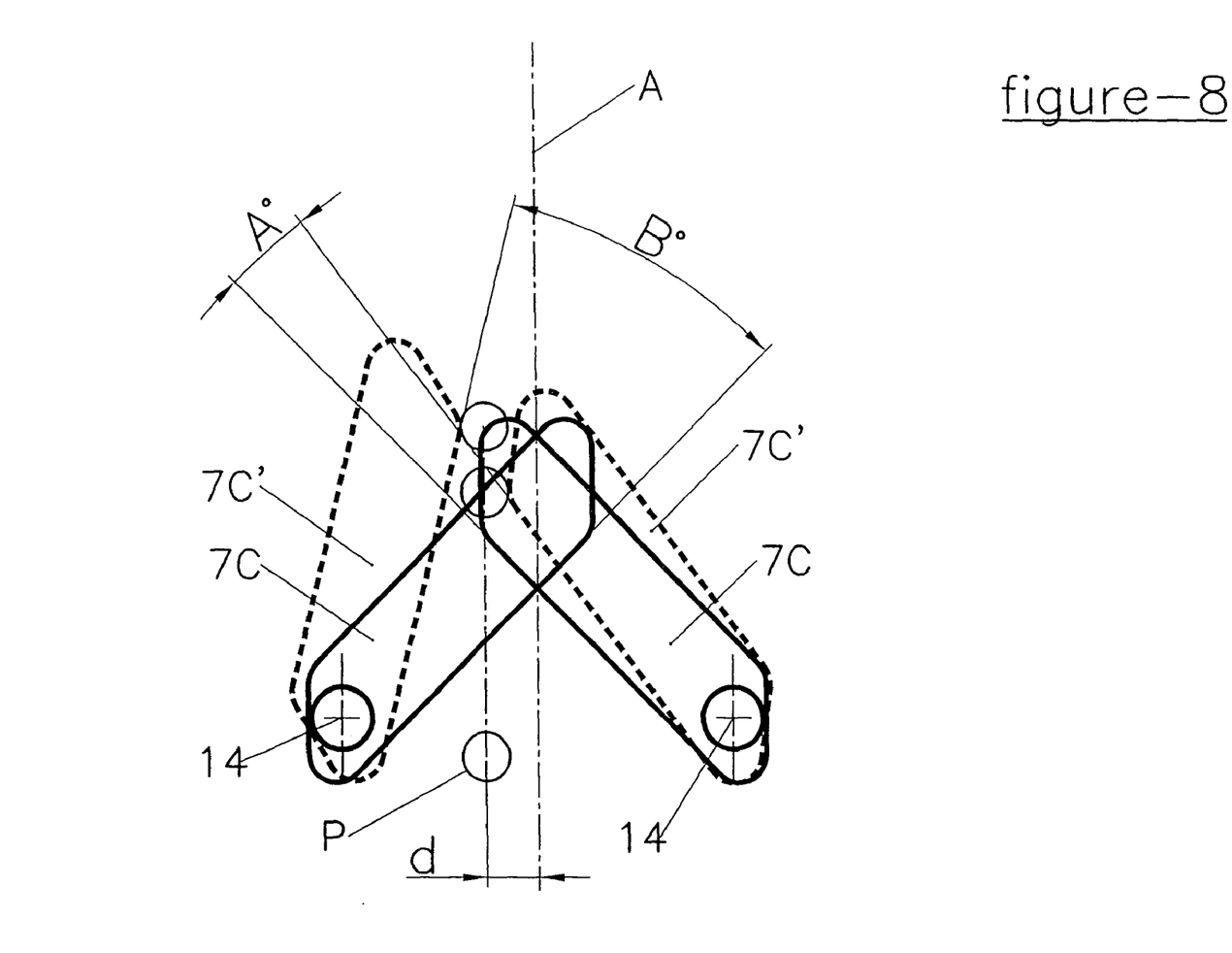
FIG. 8 is a schematic view showing the measurement of the offset angle of the symmetry axis of the harvesting head in relation to a vine stock.

In addition, according to this embodiment, angular sensors 14 can be placed at the articulation of the sensor aprons 7C so as to be able to measure the kinematical angles $A°$ and $B°$ caused by the offset d of each vine stock P in relation to the symmetry axis A of the harvesting head, as schematically represented in FIG. 8.

The direct measurement of the angles $A°$ and $B°$ makes it possible to define precisely the offset valued in relation to the symmetry axis A of the harvesting head, or: $d=f(A°, B°)$.

The description of the operation of the guiding hydraulic jack assembly 8, 9, 10 is also in this case the same as for the above-described first embodiment, with the sole exception that the corrective action is proportional to the misalignment of the symmetry axis A of the harvesting head and of the vine stock P according to the distance d that is well known because measured.

We claim:

1. A harvesting apparatus comprising:
    a harvesting head suitable for connection to a traveling carrier and suitable for straddling a single row of fruit-bearing plants, said harvesting head formed of a pair of subassemblies assembled together at an upper end thereof, said pair of subassemblies defining a channel therebetween suitable for allowing the row of fruit-bearing plants to pass therebetween, each of said pair of subassemblies comprising:
        a shaking means thereon for releasing fruit from the fruit-bearing plants; and
        a fruit-receiving means cooperative with said shaking means for receiving the released fruit;
    a straddling carrier on which said harvesting head is mounted, said straddling carrier having a median vertical plane;
    a centering means cooperative with said harvesting head for moving said harvesting head on either side thereof in relation to said median vertical plane of said straddling carrier so as to center a lower portion of said harvesting head in relation to the row of fruit-bearing plants, said centering means comprising:
        a pair of lateral jacks respectively cooperative with said pair of subassemblies of said harvesting head so as to move said pair of subassemblies from one side to another side; and a central jack extending between said pair of subassemblies of said harvesting head, said central jack and said pair of lateral jacks being synchronized together; and a control means cooperative with said centering means for activating said pair of lateral jacks and said central jack in relation to a sensed position of the row of fruit-bearing plants.

2. The harvesting apparatus of claim 1, said centering means further comprising at least one actuator.

3. The harvesting apparatus of claim 1, said centering means for moving said harvesting head perpendicular to said median vertical plane.

4. The harvesting apparatus of claim 3, said pair of lateral jacks linking said harvesting head and said straddling carrier.

5. The harvesting apparatus of claim 1, said central jack positioned at an upper portion of said harvesting head.

6. The harvesting apparatus of claim 5, each of said pair of lateral jacks having a chamber with a volume, said central jack having a chamber with a volume equal to the volume of the chambers of each of said pair of lateral jacks.

7. The harvesting apparatus of claim 4, said straddling carrier having a frame, said centering means linking said harvesting head with said frame of said straddling carrier.

8. The harvesting apparatus of claim 7, each of said pair of lateral jacks being connected to said frame of said straddling carrier and to a frame of said harvesting head.

9. The harvesting apparatus of claim 7, said central jack being attached to an upper portion of said frame of said straddling carrier, said central jack being connected to a frame at an upper portion of said harvesting head.

10. The harvesting apparatus of claim 1, each of said pair of lateral jacks having an adjusting means for controlling a length of travel of said pair of lateral jacks.

11. The harvesting apparatus of claim 1, said control means comprising a plurality of mechanical probes.

12. The harvesting apparatus of claim 1, said control means comprising a plurality of contacts with probes connected thereto.

13. The harvesting apparatus of claim 1, said control means comprising a distributor in fluid communication with said pair of lateral jacks.

14. The harvesting apparatus of claim 13, said control means comprising a plurality of probes cooperative with said distributor.

15. The harvesting apparatus of claim 1, said fruit-receiving means having a row of pivoting aprons cooperative with said control means.

16. The harvesting apparatus of claim 13, said distributor being a hydraulic distributor suitable for passing oil to said pair of lateral jacks.

17. The harvesting apparatus of claim 15, further comprising:

an angle sensing means positioned at a pivot point of the pivoting aprons for measuring a kinematic angle of the pivoting aprons.

* * * * *